(No Model.)

J. MACPHAIL.
HARVESTER WHEEL.

No. 592,800. Patented Nov. 2, 1897.

Witnesses
W. C. Coolie
C. H. Crawford

Inventor
James Macphail
By Coburn & Strong
Attys

THE NORRIS PETERS CO., PHOTO-LITHO., WASHINGTON, D. C.

UNITED STATES PATENT OFFICE.

JAMES MACPHAIL, OF CHICAGO, ILLINOIS, ASSIGNOR TO THE PLANO MANUFACTURING COMPANY, OF SAME PLACE.

HARVESTER-WHEEL.

SPECIFICATION forming part of Letters Patent No. 592,800, dated November 2, 1897.

Application filed January 18, 1897. Serial No. 619,559. (No model.)

*To all whom it may concern:*

Be it known that I, JAMES MACPHAIL, a citizen of the United States, residing at Chicago, in the county of Cook and State of Illinois, have invented a certain new and useful Improvement in Harvester-Wheels, which is fully set forth in the following specification, reference being had to the accompanying drawings, in which—

Figure 1:
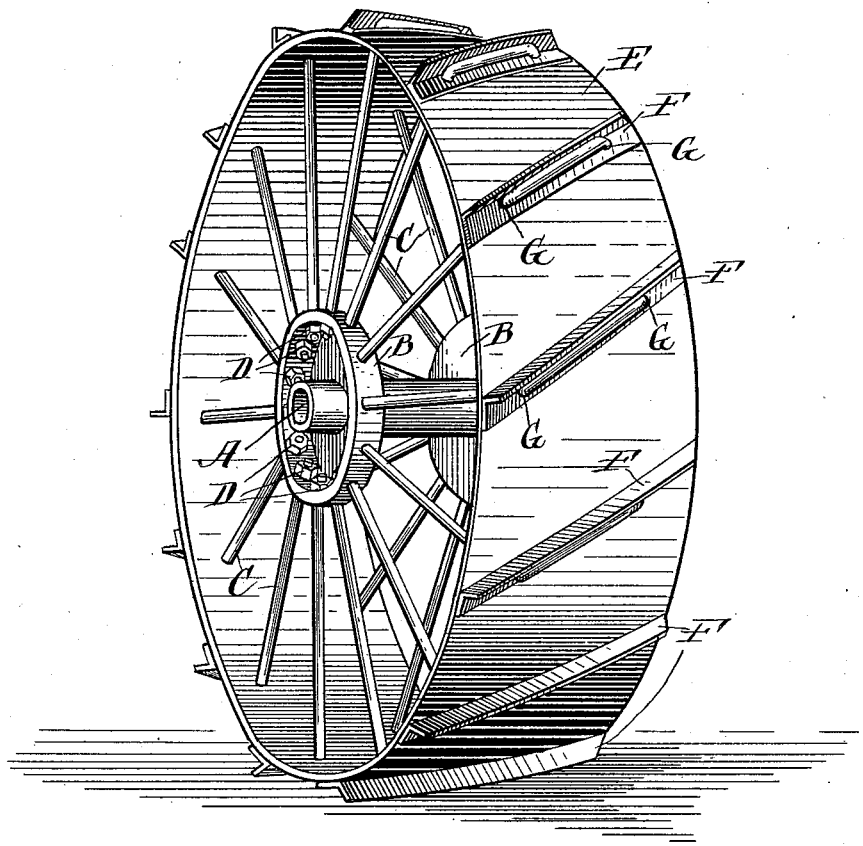
Figure 2:
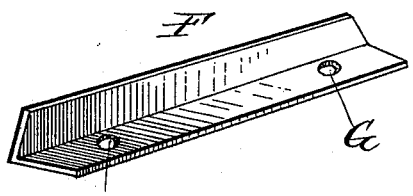

Figure 1 is a perspective view of one of my wheels. Fig. 2 is a perspective view of one of the angle-irons which I secure to the tread of the wheel.

My invention consists of an improvement upon my invention shown in my Letters Patent No. 552,295, dated December 31, 1895, for harvester-wheels. I find two objections to my wheel as described and covered in the above-named patent. In that construction I find that the spoke-rod with the piece placed under it on the tread of the wheel did not provide sufficient engaging surface with the soil when the wheel was in operation, as it did not extend the entire width of the tread of the wheel; also, that if the holes through which the U-shaped spoke passed were placed near the periphery of the tread of the wheel they would weaken the wheel and make it subject to liability of the pieces being broken out between the holes and the edge of the wheel.

To enable one to understand the construction of my wheel without reference to my former patent on said wheel, I will describe the same throughout herein, reference being had to the accompanying drawings, in which the same letters refer to the corresponding parts in both figures.

I make the central portion of my wheel with a hub A, to which are secured the spoke-flanges B.

C are U-shaped spokes, the ends of which are secured to the spoke-flanges B by nuts D.

E is the rim of the wheel, on the face of which I secure angle-plates F. One portion of the angle-plate F rests upon the face of the rim of the wheel, which portion is provided with two holes G G. There are also two rows of holes through the rim of the wheel, the same being the same distance apart as the distance between the holes G G and the angle-irons. The angle-irons are placed on the rim of the wheel so that the holes in the angle-irons are directly over holes in the rim of the wheel. The ends of the U-shaped spokes are then passed through these holes and are secured to the spoke-flanges B of the hub of the wheel.

The central portion of the U-shaped spokes holds the angle-irons firmly in position on the rim of the wheel. That part of the angle-iron which is directly under the central portion of the U-shaped spoke makes a seat for the spoke, substantially as the seat in my former patent, but the ends of the angle-iron portion extend to the periphery of the wheel, strengthening it, and at the same time the turned-up portion of the angle-iron extends above and beyond the central portion of the U-shaped spoke, forming a strong ledge to engage with the earth when my said harvester-wheel is in use as a drive-wheel for harvesters.

The vertical portion of the angle-iron rests against the central portion of the U-shaped spokes and is braced by it in a manner so as to stiffen and to hold it in its vertical position when the wheel is in use. The central portion of the U-shaped spokes not only serves to hold the angle-iron in its position upon the tread of the wheel, but also serves to brace the vertical portion of the angle-iron and prevent it from being bent down from the position in which it is most effective on the tread of a traction-wheel.

Having described the construction and operation of my invention, what I claim, and desire to secure by Letters Patent, is—

A wheel having two rows of holes in the rim; a series of angle-irons, one member of each angle-iron being provided with two holes; and U-shaped spokes, the ends of which pass through the holes in the angle-iron and in the rim; the ends of the spokes being secured to the central portion of the wheel, while the central portion of the U-shaped spokes rest upon one member of the angle-iron to secure it to the wheel and against the other member of the angle-iron to brace it and hold it in its vertical position.

JAMES MACPHAIL.

Witnesses:
A. A. MURRAY,
LOUISE SERAGE.